Figure 1:
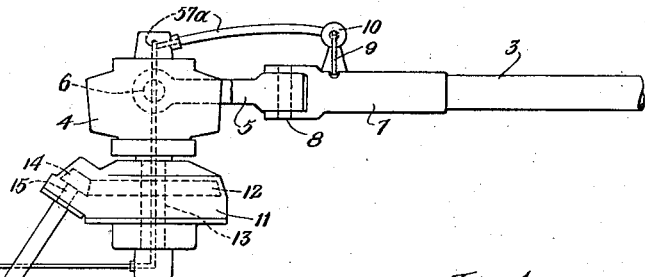

Nov. 18, 1941.  A. E. LARSEN  2,263,304
ROTATIVE WINGED AIRCRAFT
Filed July 8, 1939

INVENTOR
*Agnew E. Larsen*
BY
*Synnestvedt + Lechner*
ATTORNEYS

Patented Nov. 18, 1941

2,263,304

UNITED STATES PATENT OFFICE 2,263,304

ROTATIVE WINGED AIRCRAFT

Agnew E. Larsen, Jenkintown, Pa., assignor to Autogiro Company of America, Willow Grove, Pa., a corporation of Delaware Application July 8, 1939, Serial No. 283,360

7 Claims. (Cl. 244—118)

This invention relates to rotative winged aircraft, and especially to that type of aircraft equipped with a bladed sustaining rotor, the blades being so mounted as to provide for pitch change movement thereof.

Still more particularly, the invention is of especial utility in aircraft of the above general type in which the rotor is capable of autorotative actuation in normal flight, but is adapted to be driven for starting purposes prior to take-off from the ground.

In accordance with the invention, the rotor drive transmission incorporates hydraulically operated means for connecting and disconnecting the engine and the rotor, the said hydraulically operated means being of the type developing hydraulic pressure when the rotor is being driven. In association with this drive mechanism, I preferably employ hydraulically actuated devices for changing the blade pitch, which devices are supplied with fluid pressure from the hydraulic means of the rotor drive transmission.

It is an object of the invention to so arrange various of the mechanisms above referred to that upon control of the hydraulically operated transmission means to effect driving of the rotor, fluid pressure developed is delivered to the blade pitch control devices which serve to reduce the blade pitch during driving, preferably to zero. Upon operation of the hydraulic means of the transmission to disconnect the engine and the rotor, the fluid pressure is dissipated, so that the blade pitch is again caused to assume a positive value.

In. addition to the above, the invention contemplates the use of hydraulic brakes for the landing wheels, which brakes are also supplied with operating pressure from the hydraulic portion of the rotor drive transmission.

With provision of the foregoing arrangements, the aircraft is capable of operation substantially in accordance with the copending application of Juan de la Cierva, 738,349, filed August 3, 1934, i. e., the rotor is adapted to be driven prior to take-off up to a speed substantially in excess of the normal autorotative value, with the blade pitch angles at zero setting. During this time the wheel brakes are also applied so that the craft remains stationary on the ground until take-off is desired. At the time of take-off the transmission is actuated to disconnect the engine from the rotor and this in turn dissipates the hydraulic pressure, thereby effecting release of the wheel brakes and also permitting increase of the blade pitch, which latter preferably takes place under the influence of centrifugal force of rotation, in the general manner more fully disclosed in copending application of James G. Ray, Serial No. 91,838, filed July 22, 1936, now Patent 2,216,163, issued October 1, 1940. In accordance with another feature of the invention all of the foregoing operations are accomplished by means of a single manually operable control organ.

The manner in which the foregoing objects and advantages are achieved will appear more fully from the following description, referring to the accompanying drawing in which—

Figure 2:
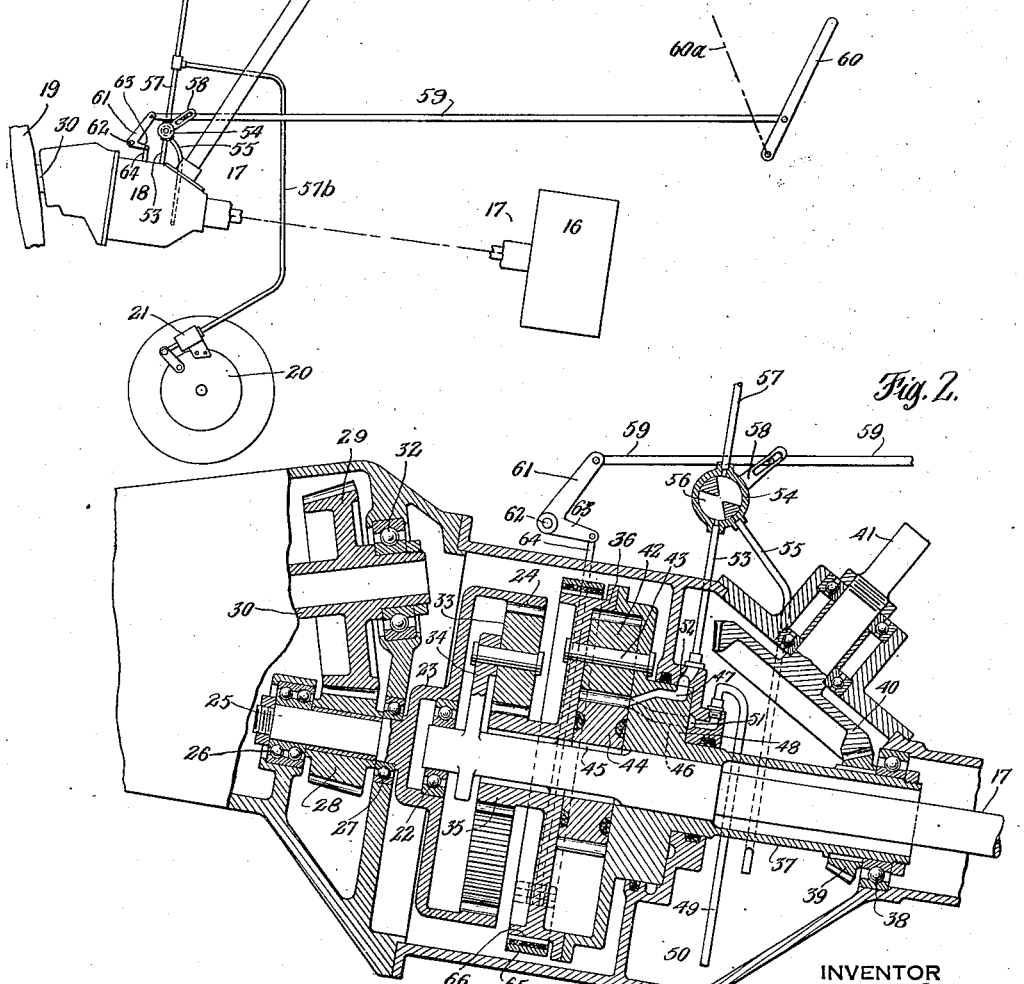

Figure 1 is a somewhat schematic layout of various parts of the mechanism including the rotor hub, a landing wheel, and the power transmission; and Figure 2 is an enlarged vertical sectional view through a portion of the rotor drive transmission.

In Figure 1 the spar or root end of one of the rotor blades appears at 3. It will be understood that any desired number of blades may be incorporated in the rotor, and preferably each one of them is pivotally connected with a rotative hub part 4 in any suitable manner, for instance, by means of a fork member 5 embracing the hub and pivoted thereto by means of trunnions, one of which appears at 6. This pivot 6 affords freedom for flapping movement of the blade. The fork member 5 in turn is connected with a sleeve 7 by means of a "drag" pivot 8 affording freedom for movement of the blade generally within its rotative path of travel.

To provide freedom for pitch change movement of the blade, the spar 3 preferably has a steep external thread at its inner end adapted to cooperate with a complementary internal thread formed in the sleeve 7, in the manner more fully set out in the copending application of James G. Ray above referred to, the angle of the thread being so related to the direction of rotation of the rotor that displacement of the blade in a radial direction under the influence of centrifugal force causes rotation of the spar 3 in that direction which will increase the blade pitch. To move the blade in the opposite sense, i. e., to reduce its pitch, an arm 9, rigid with the spar 3, projects through an aperture in sleeve 7 for cooperation with one part of a fluid pressure piston and cylinder device 10, the other part of which is rigid with the sleeve 7. Since the details of this mechanism form no part of the present invention per se they are not specifically described herein, although for complete disclosure thereof, reference may be made to said copending application of James G. Ray.

The rotative hub 4 is journaled by means of any desired bearing arrangement housed within the non-rotative casing 11, which casing also serves to enclose the ring gear 12 which is connected with the rotative hub spindle 13 through an overrunning clutch (not shown), and which is adapted to be driven by a pinion 14 carried at the upper end of drive shaft 15.

Power is adapted to be delivered to the rotor from the engine, diagrammatically illustrated at 16, through a drive shaft 17 which extends forwardly from the engine to the transmission designated generally by the numeral 18. This transmission incorporates gearing and the like for delivering power to shaft 15 which extends upwardly to the rotor and also to the propulsive airscrew 19.

Before considering the arrangement of transmission parts it may be noted that Figure 1 also shows a landing wheel 20 equipped with a hydraulic brake device 21 which device, and also the fluid pressure device 10 for changing blade pitch, both receive their actuating pressure from a source in the transmission now to be described.

Certain features of the transmission are similar to those described and claimed in copending application of Robert G. Anderson, Ser. No. 235,448, filed October 17, 1938, now Patent 2,217,883, issued October 15, 1940, and since these features form no part of the present invention per se they are not described in detail herein. It may briefly be noted, however, that the engine shaft 17 extends forwardly into the transmission casing, being journaled by a bearing 22 which is carried in a recess formed in the hub part 23 of an internal ring gear 24. The mounting shaft 25 for this gear is journaled in the casing by bearings 26 and 27 and also carries a pinnon 28 meshing with gear 29 mounted on shaft 30 which extends forwardly and constitutes the propeller mounting shaft, as appears also in Figure 1. The shaft 30 is provided with a number of suitable bearings including that shown at 32.

The ring gear 24, and thus the propulsive airscrew 19, is actuated through the medium of a planetary gear system including a plurality of planet gears 33 carried by the arms of a spider 34 which are rigid with and project from the engine shaft 17. The sun gear 35 of this system is rigid and rotatable with a housing 36, the housing having a rearwardly extending hollow shaft portion 37 journaled by a bearing 38. The power take-off to the rotor includes driving and driven gears 39 and 40 connected respectively with hollow shaft 37 and shaft 41, which latter is coupled with the shaft 15 extending upwardly to the rotor hub.

As in the copending Anderson application above referred to, the planetary gearing system, incorporating gears 24, 33 and 35, provides for two speed operation of the airscrew 19. When the sun gear 35 is restrained as against rotation or held stationary, the rotation of the planets 33 under the influence of the drive from the engine, effects over-drive of the internal gear 24. On the other hand when the sun gear 35 is caused to rotate in the same direction as the engine shaft 17, as when driving the rotor, the internal gear 24 will also be caused to rotate at the same speed as the engine shaft, i. e., at a speed lower than that of the over-drive condition above referred to.

In accordance with the present invention, for the purpose of changing from one condition to the other (which change it will be noted involves change in airscrew speed and also change as to whether or not power is being delivered to the rotor) the transmission incorporates a hydraulically operated mechanism of the gear oil pump type. This mechanism includes a series of planet gears 42 which are journaled by shafts 43 in the casing 36. The gears 42 mesh with a sun gear 44 which is keyed to the engine shaft 17 at 45. Each of the planets 42, cooperating with the sun 44, constitutes a gear pump, the inlet and outlet sides of which respectively are in communication with passages 46 and 47 formed in an enlarged part 48 of the wall of housing 36. It may here be noted that this general type of planetary gear pump unit is shown also in my copending application Serial No. 197,368, filed March 22, 1938, issued December 12, 1939, as Patent No. 2,183,119. As to its operation, assuming a constant supply of liquid, such as oil, entering through passage 46, whenever there is relative rotation between the planets 42 and the sun gear 44, that rotation may be resisted by blocking off or constricting the outlet passage 47. It is by means of this principle that the housing 36 and the parts carried therewith are caused to rotate with sun gear 44 and thus also with the engine shaft 17, thereby delivering power to the rotor driving gear 39.

As clearly shown in Figure 2, the actuating fluid is supplied to passage 46 by means of an intake pipe 49 receiving its supply of oil from the reservoir 50 in the bottom of the transmission casing. The pipe 49 communicates with an annular groove 51 so located as to maintain communication with the inlet passages 46 during rotation of the part 48 with the casing 36.

The outlet passage 47 at all times communicates with an annular groove 52 which is coupled by means of pipe 53 with a valve housing 54. The housing 54 has a return connection 55 extended back for delivery of oil to the reservoir 50 in the transmission casing.

As clearly shown, the valve member 56 in the position of Figure 2 blocks the connection to pipe 55. In this position the third connection 57 to this valve is open, thereby delivering pressure to the branches 57a and 57b which extend respectively to the blade pitch control devices and to the wheel brakes.

As to operation of this portion of the mechanism, it is pointed out that since pipe 55 is blocked with the valve 54 in the position shown, the pressure in the outlet passages 47 and in pipes 53, 57, 57a and 57b will very quickly rise and thus will in turn resist and substantially prevent relative rotation of the planets 42 with respect to the sun gear 44. As above noted, this action causes the housing 36 and the parts associated therewith (including sun gear 35 and rotor driving gear 39) to rotate in the same direction as the engine shaft 17. The speed of rotation will of course be slightly lower than that of the engine shaft because of the small but unavoidable leakage past the intermeshing gear teeth of the planets 42 and sun 44.

In consequence of the above the rotor is driven, and in addition the wheel brakes are applied and the rotor blade pitch change devices 10 are actuated to reduce the blade pitch. The airscrew 19 at this time will also be caused to rotate at a relatively low speed (because of rotation of sun gear 35) and by virtue of that fact, adequate power is available for delivery to the rotor, in order to rotate the rotor up to a speed preferably higher than the normal auto-rotative rate. Upon attaining the desired rotor speed, the valve member 56 is moved in a counterclockwise direction, by means of actuating arm 58 to a position such that all three of the associated pipe connections (53, 55 and 57) are placed in communication with each other. This will release the pressure in the blade pitch control devices 10 and in the wheel brakes, the pipe 55 being open for discharge of fluid to the reservoir 50 which, of course, is at relatively low, normal atmospheric pressure.

Upon release of the pressure in the pitch control devices 10, the centrifugal force on the blades moves them to a positive pitch setting such as is required to effect "direct" take-off in the general manner hereinbefore more fully described. The overrunning clutch at the rotor hub allows the rotor to freely overrun the drive during take-off and flight.

The control mechanism for valve 54 comprises a link 59 which is coupled to the actuating arm 58 and which may be operated by the control lever 60. The link 59 is also extended to be coupled with one arm 61 of a bell crank pivoted at 62, the other arm of the bell crank 63 being coupled by a link 64 with a contractable brake band 65, adapted to frictionally engage a braking surface 66 formed on the housing 36. When the valve 54 is actuated to release the pressure in the associated connections, i. e., when the lever 60 is moved forwardly to the dotted line position 60a shown in Figure 1, the brake band 65 is caused to engage the casing 36 and thus arrest rotation thereof. This in turn arrests rotation of the sun gear 35 which effects overdrive of the airscrew 19, thereby increasing the speed of the airscrew to a value suitable for effecting rapid take-off and for flight.

While a supplementary independently operable wheel brake control may be combined with the control above described, this may not be essential since the "roll" on landing need not be very great because of the capability of this type of aircraft to descend to a landing at a steep angle or even vertically.

I claim:

1. In an aircraft having a variable pitch bladed sustaining rotor and an engine, fluid pressure actuable means for varying the blade pitch, rotor drive mechanism interconnecting the engine and the rotor and being controllable to establish and disestablish power transmission from the engine to the rotor, said rotor drive mechanism incorporating a hydraulic device developing fluid pressure when power transmission is established, and a connection for transmitting said pressure to the rotor blade pitch-varying means.

2. In an aircraft having a bladed sustaining rotor, an engine, and a landing wheel with a brake thereon, fluid pressure actuable means for applying the wheel brake, rotor drive mechanism interconnecting the engine and the rotor and being controllable to establish and disestablish power transmission from the engine to the rotor, said rotor drive mechanism incorporating a hydraulic device developing fluid pressure when power transmission is established, and a connection for transmitting said pressure to the wheel brake.

3. A construction in accordance with claim 1, in which the means for varying the blade pitch operates to reduce the blade pitch upon delivery of fluid pressure to said means.

4. In an aircraft having a variable pitch bladed sustaining rotor, an engine, and a landing wheel with a brake thereon, fluid pressure actuable means for varying the blade pitch, fluid pressure actuable means for applying the wheel brake, rotor drive mechanism interconnecting the engine and the rotor and being controllable to establish and disestablish power transmission from the engine to the rotor, said rotor drive mechanism incorporating a hydraulic device developing fluid pressure when power transmission is established, and connections for transmitting said pressure to the rotor blade pitch-varying means and to the wheel brake.

5. An aircraft in accordance with claim 4, in which the means for varying the blade pitch operates to reduce the blade pitch upon delivery of fluid pressure to said means, whereby transmission of power to the rotor is accompanied by reduction of blade pitch and application of the wheel brake.

6. In an aircraft having a variable pitch bladed sustaining rotor, a propulsive airscrew and an engine, fluid pressure actuable means for varying the blade pitch, airscrew drive mechanism including two-speed gearing for connecting the engine with the airscrew, rotor drive mechanism interconnecting the engine and the rotor and being controllable to establish and disestablish power transmission from the engine to the rotor, said rotor drive mechanism incorporating a hydraulic device developing fluid pressure when power transmission is established, a connection for transmitting said pressure to the rotor blade pitch-varying means, and means for controlling said two-speed gearing responsive to establishment or disestablishment of the power transmission to the rotor in a sense providing lower airscrew speed when the rotor is being driven than when the rotor is not being driven.

7. In an aircraft having a variable pitch bladed sustaining rotor and an engine, fluid pressure actuable means for varying the blade pitch, rotor drive mechanism for transmitting power from the engine to the rotor, means for establishing and disestablishing power transmission through said mechanism including a hydraulic device developing fluid pressure when power transmission is established, and a connection for transmitting said pressure to the rotor blade pitch-varying means.

AGNEW E. LARSEN.